United States Patent [19]

Saidi et al.

[11] Patent Number: 5,453,261

[45] Date of Patent: Sep. 26, 1995

[54] METHOD OF SYNTHESIZING HIGH SURFACE AREA VANADIUM OXIDES

[76] Inventors: M. Yazid Saidi, 492 Capitol Village Cir., San Jose, Calif. 95136; On K. Chang, 1031 Belvedere La., San Jose, Calif. 95129

[21] Appl. No.: 263,309

[22] Filed: Jun. 21, 1994

[51] Int. Cl.$^6$ ................................ C01G 31/02
[52] U.S. Cl. ............................ 423/592; 264/56
[58] Field of Search ............ 423/592; 264/DIG. 25, 264/56

[56] References Cited

U.S. PATENT DOCUMENTS

| | | | |
|---|---|---|---|
| 4,119,707 | 10/1978 | Thome et al. | 423/592 |
| 4,486,400 | 12/1984 | Riley | 423/592 |
| 4,619,822 | 10/1986 | Hammou et al. | 423/592 |

FOREIGN PATENT DOCUMENTS

| | | | |
|---|---|---|---|
| 749866 | 1/1967 | Canada | 423/592 |
| 1-320228 | 12/1989 | Japan | 423/592 |
| 1084327 | 4/1984 | U.S.S.R. | 423/592 |

*Primary Examiner*—Steven Bos
*Attorney, Agent, or Firm*—Robert E. Krebs

[57] ABSTRACT

A method of synthesizing higher surface area vanadium oxides, having the chemical formula $V_2O_{13+x}$, wherein $0 \leq X \leq 0.5$, that are employed in fabricating cathode active materials for solid secondary electrochemical cells, is provided. The method includes forming dense $NH_4VO_3$ pellets and heating the pellets to decompose the $NH_4VO_3$ into $V_2O_5$ and $NH_3$, whereby the $NH_3$ reduces the $V_2O_5$ into vanadium oxides.

14 Claims, No Drawings

METHOD OF SYNTHESIZING HIGH SURFACE AREA VANADIUM OXIDES

FIELD OF THE INVENTION

The present invention provides a method of synthesizing vanadium oxides having high surface areas. Vanadium oxides are often cathode active materials for use in solid secondary lithium electrochemical cells.

BACKGROUND OF THE INVENTION

Solid secondary lithium electrochemical cells are known in the art and typically consist of a lithium or lithium-based metal anode, a lithium-ion conducting solid electrolyte, and a cathode containing a lithium ion insertion electrode material. An insertion electrode material is capable as acting as a cathode by virtue of its ability to reversibly accommodate lithium ions physically inserted into its structure during discharge of the cell and subsequently removed therefrom during charging of the cell. Such insertion electrode materials (or intercalation compounds) include $V_2O_5$, $TiS_2$, $V_6O_{13}$, $LiCoO_2$ which have satisfactory specific energy densities of about 300–900 Wh kg$^{-1}$ and mid-discharge voltages of about 2–3 volts.

Solid secondary lithium electrochemical cells using $V_6O_{13}$ as the active cathode material are well studied. K. West et al., J. Power Sources, 14 (1985) 235–246, studied $V_6O_{13}$ as a cathode material for lithium cells using polymeric electrolytes. They found that the lithium insertion reaction was reversible in the composition interval $Li_xV_6O_{13}$ [$0 \leq x \leq 8$]. The high stoichiometric energy density for the ultimate composition $Li_8V_6O_{13}$, 890 W h/kg, is very favorable for battery applications. P. A. Christian et al., U.S. Pat. No. 4,228,226 suggest that lithiated vanadium oxides of the composition $Li_xVO_{2+y}$ [$0<y\leq 0.4$] may be prepared chemically by treatment of $VO_{2+y}$ with n-butylithium in hexane. Christian et al. report that the unit cell parameters derived from X-ray powder diffraction data suggest that the compositions $Li_xV_6O_{13}$ have a structure very similar to that of the monoclinic $V_6O_{13}$, i.e., $VO_{2+y}$ [$0.1<y<0.2$], prepared at higher temperature. The use of $Li_xVO_{2+y}$, chemically manufactured as aforesaid, as the positive electrode material in a cell, permits the manufacture of cells in the discharged state.

It has been reported in U.S. Pat. No. 4,228,226 that vanadium oxides with nominal compositions close to $V_6O_{13}$ i.e. oxides with the nominal stoichiometry range from $VO_{2.05}$ to $VO_{2.2}$ are readily prepared by the thermal decomposition of ammonium vanadate, $NH_4VO_3$, at a controlled rate in an inert atmosphere such as argon or nitrogen, at a temperature of approximately 450° C. Furthermore, the heat treatment of $V_6O_{13}$ prepared in this manner can alter the lithium capacity of the material when used as a cathode active material in solid secondary lithium cells. It has also been observed that the morphology of vanadium oxide solids can affect the lithium capacity of the material under the same circumstances.

D. W. Murphy et al., J. Electrochemical Soc. 128 (1981) 2053, report the synthesis of $V_6O_{13}$ and $V_6O_{13+x}$ [$0<X\leq 0.5$]. Stoichiometric amounts of $V_2O_5$ and vanadium metal powder were intimately mixed and heated to 600° C. in an evacuated quartz tube. The vanadium-oxygen stoichiometry was verified by thermal gravimetric analysis in an oxygen atmosphere. $V_6O_{13+x}$ [$0<X\leq 0.5$] was produced by thermally decomposing the ammonium vanadate under an argon stream.

Vanadium oxides $V_3O_7$, $V_4O_9$, $V_6O_{13}$ and $V_6O_{13+x}$ [$0.16 \leq X \leq 0.5$] have been examined by Murphy et al., ibid., as cathode materials in ambient temperature non-aqueous secondary lithium cells. According to Murphy et al., the best cathode materials are $V_6O_{13}$ and a slightly oxygen-rich $V_6O_{13+x}$. Only the latter cathode materials consistently exhibited substantial capacities, good rechargability, and high charge potentials; and therefore made the best candidates for use as cathode active materials in non-aqueous lithium secondary batteries. Conventional thermal decomposition techniques produce solid $V_6O_{13}$ [$0 \leq X \leq 0.5$] having a surface area to weight ratio of only 10–12 m$^2$/g. The vanadium oxide must be further processed (e.g., grinded) to increase this ratio in fabricating the cathode.

It would be advantageous to have a method for synthesizing $V_6O_{13+x}$ [$0 \leq X \leq 0.5$] wherein the product has an inherently high surface to weight ratio. This would reduce the amount of grinding necessary after its formation.

SUMMARY

The present invention improves the morphology of vanadium oxide having the chemical formula $V_6O_{13+x}$ [$0 \leq X \leq 0.5$] in that the surface to weight ratio of the solid vanadium oxide produced, even before any grinding process, is greater than about 20 m$^2$/g.

In one aspect, the invention is directed to a method of synthesizing vanadium oxides with the chemical formula $V_6O_{13+x}$ [$0 \leq X \leq 0.5$] comprising the steps of:

providing dense $NH_4VO_3$ pellets;

subjecting said dense $NH_4VO_3$ pellets to a sufficient amount of heat to cause $NH_4VO_3$ to decompose into $V_2O_5$ and gaseous $NH_3$, and allowing the $NH_3$ to reduce the $V_2O_5$ to form said vanadium oxides.

In another aspect, the invention is directed to a method of synthesizing vanadium oxides with the chemical formula $V_6O_{13+x}$ [$0 \leq X \leq 0.5$] comprising the steps of:

applying sufficient pressure to $NH_4VO_3$ to form a $NH_4VO_3$ pellet having a density of at least about 1.7 g/cc;

placing said $NH_4VO_3$ pellet into a chamber having an inert atmosphere;

subjecting said $NH_4VO_3$ pellet to a sufficient amount of heat to cause said $NH_4VO_3$ to decompose into $V_2O_5$ and to evolve gaseous $NH_3$; and allowing the $NH_3$ to reduce the $V_2O_5$ to form said vanadium oxides.

In a preferred embodiment, the vanadium oxides formed have a surface to weight ratio of about 20 to about 25 m$^2$/g. In another embodiment, the $NH_4VO_3$ pellet is formed by applying approximately 600 to 1,500 kg/cm$^2$ pressure to $NH_4VO_3$.

In yet another aspect, the invention is directed to a method of synthesizing a high surface area product from a substance which is capable of thermal decomposition accompanied by the evolution of gaseous products, which method comprises the steps of:

applying a sufficient amount of pressure to said substance to form a solid dense pellet of said substance; and heating said pellet to thermally decompose said substance.

DETAILED DESCRIPTION OF THE PREFERRED EMBODIMENTS OF THE INVENTION

The present invention is based, in part, on the discovery that $V_6O_{13}$ and vanadium oxides with nominal compositions close to $V_6O_{13}$, i.e., $V_6O_{13+x}[0 \leq x \leq 0.5]$, (collectively referred to herein as $V_6O_{13}$) can be synthesized by a thermal decomposition process which yields vanadium oxides that have inherently high surface to weight ratios. With the inventive process, sufficient pressure is applied to ammonium metavanadate, $NH_4VO_3$, to form dense, compact pellets before the $NH_4VO_3$ is subject to thermal decomposition. It is believed that the release of gaseous products, e.g., $NH_3$, formed during decomposition breaks up the solid agglomerates into smaller particles. Furthermore, the denser the initial $NH_4VO_3$ pellets is the higher the surface to weight ratio of the $V_6O_{13}$ produced. Apparently the degree of compactness of the $NH_4VO_3$ pellets is related to the level of violence at which the gaseous products is released.

Prior to describing this invention in further detail, the following terms will first be defined.

Definitions

As used herein, the following terms have the following meanings.

The term "stoichiometric" or "stoichiometric compound" refers to a compound where the ratio of the number of atoms to each other, as determined from atomic weight, is a ratio of small, whole numbers. In "non-stoichiometric compounds" there are defects in the crystal lattice or partial replacement of the atoms of one element by those of another. The term "nominal stoichiometry" is used to refer to non-stoichiometric compounds where the ratio of the number of atoms to each other is not a ratio of small whole numbers.

The term "oxidation state" of an element in a compound refers to the difference between the number of electrons associated with an ion in the compound as compared with the number of electrons associated with the neutral atom of the element. In "oxidation" the oxidation state of an atom is increased. One way to perform oxidation is to increase the proportion of oxygen in the compound. "Reduction" decreases the proportion of oxygen in the compound.

The term "solid, secondary electrolytic cell" or "solid, secondary electrochemical cell" refers to a composite electrolytic cell comprising a lithium anode, a solid, solvent-containing electrolyte and a cathode comprising a cathodic material capable of repeated discharge/charge cycles so as to permit repeated reuse wherein the electrolyte is interposed between the anode and the cathode. The solid, solvent-containing electrolyte comprises an electrolytic solvent, an alkali salt, and a solid polymeric matrix.

The term "electrolytic solvent" (or "electrolyte solvent") refers to the solvent (i.e., plasticizer) included in the composite electrode and the electrolyte for the purpose of solubilizing alkali salts during operation of the electrolytic cell and which also act as a plasticizer. The solvent can be any low volatility aprotic polar solvent. Preferably, these materials are characterized by a boiling point greater than about 85° C. In this regard, low volatility for the electrolytic solvent simplifies manufacture of the electrolyte and improves the shelf-life of the resulting battery.

If the solid matrix forming monomer or partial polymer thereof employed in either the solid solvent-containing electrolyte or the composite electrode (cathode or anode) is cured or further cured by radiation polymerization to form the solid matrix, then the solvent should be radiation inert at least up to the levels of radiation employed. If the solid matrix forming monomer or partial polymer thereof is cured or further cured by thermal polymerization, then the solvent should be thermally inert at least up to the temperatures of thermal polymerization. Additionally, the solvent should not scavenge free radicals.

Representative examples of suitable electrolytic solvents include, by way of example, propylene carbonate, ethylene carbonate, γ-butyrolactone, tetrahydrofuran, glyme (1,2-dimethoxyethane), diglyme, triglyme, tetraglyme, dimethylsulfoxide, dioxolane, sulfolane and the like, and mixtures thereof. A preferred solvent is a mixture of an organic carbonate and triglyme, with a 4:1 weight ratio mixture of propylene carbonate:triglyme being particularly preferred, as disclosed in U.S. patent application Ser. No. 07/918,509 filed on Jul. 22, 1992 which application is incorporated herein by reference in its entirety.

The term "alkali salt" refers to those salts wherein the cation of the salt is an alkali selected from the group consisting of lithium, sodium, potassium, rubidium and cesium which salts are suitable for use in the solid, solvent-containing electrolyte and in the composite electrodes of an electrolytic cell. The particular alkali salt employed is not critical and examples of suitable alkali salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The alkali is preferably selected from the group consisting of lithium, sodium, potassium, and cesium and most preferably is lithium.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "anode" refers to an electrode, for the half-cell reaction of oxidation on discharge, which is typically comprised of a compatible anode material, i.e., any material which functions as an anode in the solid electrochemical cell. Preferred are lithium anodes which comprise lithium, including, by way of example, metallic lithium, lithium alloys, such as alloys of lithium with aluminum, mercury, zinc, and the like, and intercalation based anodes containing lithium such as those based on carbon, tungsten oxides, and the like.

The "cathode" refers to the counter-electrode to the anode. Preferably, the cathode comprises a compatible cathodic material which refers to any material which functions as a positive electrode (cathode) in a solid, secondary electrolytic cell and which is capable of being recharged (recycled) and which, when employed with the lithium anode, provides a fabricated electrolytic cell potential of at least about 2 volts. Such compatible cathodic materials are well known in the art and include, by way of example, manganese dioxide, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The particular compatible cathodic material employed is not critical, however, with respect to the present invention the cathodic material includes vanadium oxides having the chemical formula $V_6O_{13+x}[0 \leq X \leq 0.5]$.

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial polymer thereof.

The term "cycle life" refers to the number of discharge/charge cycles which can be conducted on an electrolytic cell before that cell is no longer able to maintain a capacity in the charged state equal to at least 50% of its charged capacity after fabrication.

The term "battery" refers to one or more electrochemical cells electrically interconnected in an appropriate series/parallel arrangement to provide the required operating voltage and current levels.

The term "decomposition" refers to the chemical separation of a substance into two or more substances, which may differ from each other and the original substance.

The term "dense $NH_4VO_3$ pellet" refers to solid $NH_4VO_3$ in the form of a compact mass that has a density of at least about 1.7 g/cc, and preferably about 1.7 to 1.9 g/cc. The compact mass can have any configuration, although said pellets are preferably cylindrical. To insure that a pellet can be quickly heated uniformly and throughout, each pellet should preferably have a mass of approximately 0.5 to 3.0 g, and more preferably 1.0 to 2.0 g. Conventional presses can be used to fabricate the pellets (such as the Carver Laboratory Press, Model 311011D, available from Fred S. Carver Inc., Wabash, Ind.).

METHOD $V_6O_{13}$ can be synthesized by thermal decomposition of ammonium vanadate ($NH_4VO_3$) in an inert atmosphere (such as argon or nitrogen) at a temperature of about 300°–500° C. The process requires about 4–20 hours and during this process, $NH_4VO_3$ first decomposes to release $NH_3$ and $H_2O$, as follows:

$$2NH_4VO_3 \rightarrow V_2O_5 + 2NH_3 + H_2O \qquad (I)$$

Subsequently, the released $NH_3$ acts as a reducing agent on the $V_2O_5$ to produce $V_6O_{13}$, as follows:

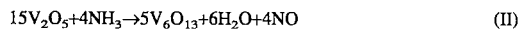

$$15V_2O_5 + 4NH_3 \rightarrow 5V_6O_{13} + 6H_2O + 4NO \qquad (II)$$

With the inventive process, prior to the thermal decomposition step, the solid $NH_4VO_3$ is compacted with pressure in the order of 600–1500 kg/cm² (or higher) to create dense pellets. Because the resulting $NH_4VO_3$ is so compressed, the release of $NH_3$ during decomposition is very vigorous which causes the $V_2O_5$ particles (and ultimately the $V_6O_{13}$ particles) to be very small. The $V_6O_{13}$ particles produced have an average surface to weight ratio of about 20–24 m²/g (or higher). The particles are also homogeneous in their size distribution. This method reduces or eliminates the amount of grinding (or the use of any other mechanical technique) needed to produce $V_6O_{13}$ particles with the required surface to weight ratio for use as a compatible cathodic material.

With the inventive method, the solid $NH_4VO_3$, in the form of dense pellets, undergoes thermal decomposition in a heated chamber that is preferably continuously purged with a stream of carrier gas comprising an inert gas (e.g., argon or nitrogen). The purging drives off excess ammonia, water vapor, nitric oxide that evolve in the reaction, however, the rate of the carrier gas passing through the chamber should not be so high as to drive off so much ammonia that the requisite amount needed to reduce the $V_2O_5$ is not present. Conversely, if the amount of released ammonia in the reaction chamber is too high (that is, when the carrier gas flow rate is too low), $VO_2$, a more reduced form of vanadium oxide, is produced. One skilled in the art can readily ascertain the requisite level of purging required. The $NH_4VO_3$ and $V_2O_5$ can also be continuously agitated to ensure uniform heating and uniform exposure to the carrier gas.

The synthesis of $V_6O_{13}$ from dense $NH_4VO_3$ pellets occurs in two steps. First, ammonia ($NH_3$) is released from $NH_4VO_3$ by Reaction I shown above, and, second, $V_2O_5$ is reduced by the ammonia to form $V_6O_{13}$ by Reaction II, as also shown. To achieve the desired results, the temperature of the $NH_4VO_3$ and carrier gas is preferably first gradually increased from ambient to a temperature of about 200° to 250° C. at an approximate rate of 0.5° to 1° C. per minute. The temperature can be raised in a series of steps, linearly or by a combination of these two methods. During this initial heating process, essentially all the $NH_4VO_3$ is decomposed and solid $V_2O_5$ having a high surface to weight ratio is produced. Subsequent heating of the $V_2O_5$ and gas, which now includes the carrier gas as well as the gaseous byproducts, at approximately the same rate (i.e., 0.5° to 1° C. per min.) facilitates the reduction of $V_2O_5$ by $NH_3$ into $V_6O_{13}$. The heating continues until the temperature reaches a final temperature of between approximately 400° to 500° C., and preferably approximately 450° C. (In one preferred process, the dense $NH_4VO_3$ pellets are heated (i.e., ramped) from near room temperature to about 450° C. in a period of about 14 hours.) Thereafter, the $V_6O_{13}$ is either (1) maintained at the final temperature for a few hours before allowing it to cool (or cooling it) or (2) allowed to cool (or cooled by cooling means).

During the heating process, the rate of ammonia evolution is proportional to the ramp rate (or heating rate). Therefore, the carrier gas flow rate must be adjusted accordingly to assure that the ammonia concentration in the reaction chamber is maintained within an acceptable range.

The $V_6O_{13}$ product has a dark-blue color. X-ray diffraction can be employed to determine the purity of the product. Thermogravimetric analysis and potentiometric titration can be employed to assess the vanadium's oxidation state.

The application of 600–1500 kg/cm² of pressure to $NH_4VO_3$ (Kerr-McGee Chemical Corp., Oklahoma City, Okla.) was used to produce pellets having a density in the range of approximately 1.7 to 1.9 g/cc. Thereafter, the pellets were subjected to thermal decomposition by the foregoing process. The $V_6O_{13}$ produced had a surface to weight ratio of approximately 21–23 m²/g. By comparison, $NH_4VO_3$ that was subjected to thermal decomposition, without first having been compressed into dense pellets, yielded $V_6O_{13}$ having a surface to weight ratio of only approximately 10–12 m²/g.

Although the inventive method encompasses the application of even higher pressures (than 600–1500 kg/cm²) to create denser pellets which in turn yields vanadium oxides with even higher surface to weight ratios, there are practical limitations (and theoretical ones) as to how dense the pellets can be. For the purpose of using $V_6O_{13}$ as a compatible cathode material for secondary lithium electrolytic cells or batteries, the $V_6O_{13}$ should preferably have a final surface to weight ratio of approximately 20–25 m²/g. Thus, depending on the size and porosity of the $V_6O_{13}$ particles produced by the inventive method, it may be necessary to grind the $V_6O_{13}$ (or the cathode power mixture).

The higher surface area (or smaller size) of the $V_6O_{13}$ compatible cathodic material (particle) affords improved kinetics and charge transfer at the particle interface. The higher surface area also contributes to improved ion diffusion in secondary lithium cells and batteries. This results in higher utilization/capacity of the compatible cathodic material.

As is apparent, the inventive method is also not limited to the synthesis of $V_6O_{13}$ with high surface to weight ratios. Rather, it is applicable to any substance that undergoes decomposition, with the concomitant release of gases, to produce a solid product.

Utility

The vanadium oxide cathode mixtures described herein are useful in preparing electrochemical cells having improved cumulative capacity and cycle life in comparison to electrochemical cells containing conventional vanadium oxide cathode formulations. Moreover, the subject vanadium oxide cathode mixtures should be particularly useful in preparing solid electrolyte cells having improved cumulative capacity and cycle life in comparison to solid electrolyte cells comprising conventional vanadium oxide cathode compositions.

EXAMPLES

The following Example 1 illustrates a method of how an electrolytic cell could be fabricated.

EXAMPLE 1

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio.

The adhesion promoter layer is prepared as a dispersed colloidal solution in one of two methods. The first preparation of this colloidal solution for this example is as follows:

84.4 parts by weight of carbon powder (Shawinigan Black™—available from Chevron Chemical Company, San Ramon, Calif.)

337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)

578.0 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from B. F. Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lighting Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13}$ [prepared by the method of the present invention] and 5.9±1.1 weight percent of carbon (available from AKZO Chemicals, Inc., Chicago, Ill., under the tradename of Ketjen Black EC 600JD™). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. (The grinding assures that the $V_6O_{13}$ has a surface to weight ratio of about 30 $m^2/g$ or more.) Afterwards, the resulting mixture is passed through a 200 mesh screen and then dried in a vacuum or in an inert gas atmosphere (e.g., argon) to produce a cathode powder with a water content of less than about 1000 ppm and preferably less than about 700 ppm.

ii. Cathode Paste

A cathode paste is prepared by combining sufficient cathode powder to provide for a final product having about 53 weight percent $V_6O_{13}$. The paste contains the following (in approximate weight percent):

| | |
|---|---|
| $V_6O_{13}$ | 53.00% |
| Carbon | 3.70% |
| 4:1 propylene carbonate/triglyme | 31.90% |
| polyethylene oxide | 2.00% |
| polyethylene glycol diacrylate | 8.00% |
| ethoxylated trimethylolpropane triacrylate | 1.40% |

The method of preparing 100 grams of the cathode paste is as follows:

31.9 grams of a solvent having a 4:1 weight ratio of propylene carbonate:triglyme is mixed with 8 grams of polyethylene glycol diacrylate (molecular weight about 400 available as SR-344 from Sartomer Company, Inc., Exton, Pa.) and 1.4 grams of ethoxylated trimethylol-propane triacrylate (TMPEOTA) (molecular weight about 450 and available as SR-454 from Sartomer Co., Inc.) in a double planetary mixer (Ross No. 2 mixer, available from Charles Ross & Sons, Co., Hauppage, N.Y.) to form a solvent solution.

53 grams of $V_6O_{13}$, 3.7 grams of carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45° C. until applied onto the current collector. The so-prepared cathode paste can be placed onto the adhesion layer of the current collector by extrusion at a temperature of from about 45° to about 48° C. The extruded cathode paste is then spread to a substantially uniform thickness of about 50–120 microns over the current collector by a comma bar.

C. Electrolyte 60.19 grams of propylene carbonate, 15.05 grams of triglyme, and 11.93 grams of urethane acrylate (Actilane SP023, available from Akcros Chemicals, Ltd., Manchester, United Kingdom) are combined at room temperature until homogeneous. The resulting solution is optionally passed through a column of 4A molecular sieves to remove water and then mixed at room temperature until homogeneous.

At this point, 3 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.83 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C.

In one optional embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 60.19 g | 60.19 |
| Triglyme | 15.05 g | 15.05 |
| Urethane Acrylate | 11.93 g | 11.93 |
| $LiPF_6$ | 9.83 g | 9.83 |
| PEO Film Forming Agent | 3.00 g | 3.00 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent and the $LiPF_6$ salt, is filtered to remove any solid particles or gels remaining in the solution. One suitable filter device is a sintered stainless steel screen having a pore size between 1 and 50 microns at 100% efficiency.

In the alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over 4A molecular sieves (Grade 514, 8–12 Mesh from Schoofs Inc., Moraga, Calif.) and then proceed to step 4.

2. Dry the propylene carbonate and triglyme over 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent and is light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. After the final addition of the $LiPF_6$ salt, stir for an additional 30 minutes, degas, and let sit overnight and cool.

9. Filter the solution through a sintered stainless steel screen having a pore size between 1 and 50 microns at 100% efficiency.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte laminated to a solid cathode which is affixed to a current collector.

D. Anode

The anode comprises a sheet of lithium foil (about 50μ thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

While the invention has been described in terms of various preferred embodiments, the skilled artisan will appreciated the various modifications, substitutions, omissions and changes which may be made without departing from the spirit thereof. The descriptions of subject matter in this disclosure are illustrative of the invention and are not intended to be construed as limitations upon the scope of the invention.

What is claimed:

1. A method of synthesizing vanadium oxide having a chemical formula $V_6O_{13+x}$ wherein $0 \leq X \leq 0.5$ and having a surface area of greater than about 20 $m^2/g$ which method comprises the steps of:

providing dense $NH_4VO_3$ pellets, wherein the pellets have a density of at least about 1.7 g/cc;

subjecting said dense $NH_4VO_3$ pellets to a sufficient amount of heat to decompose the $NH_4VO_3$ pellets into $V_2O_5$ and gaseous $NH_3$; and reducing the $V_2O_5$ with the gaseous $NH_3$ to form said vanadium oxide.

2. The method of claim 1 wherein the vanadium oxide has a surface area of about 20 to about 24 $m^2/g$.

3. The method of claim 1 wherein the vanadium oxide has a surface area of about 21 to about 23 $m^2/g$.

4. The method of claim 2 wherein the step of subjecting said dense $NH_4VO_3$ pellets to a sufficient amount of heat comprises raising the temperature of said dense $NH_4VO_3$ pellets to a temperature of between about 200° to 500° C.

5. The method of claim 4 wherein the step of raising the temperature of said dense $NH_4VO_3$ pellets comprises raising the temperature at a rate of approximately 0.5° to 1° C. per minute.

6. The method of claim 5 wherein the step of raising the temperature of said dense $NH_4VO_3$ pellets comprises heating said dense $NH_4VO_3$ pellets from about room temperature to about 450° C. over about a 14 hour period.

7. A method of synthesizing vanadium oxide having a chemical formula $V_6O_{13+x}$ wherein $0 \leq X \leq 0.5$ and having a surface area of greater than about 20 $m^2/g$ which method comprises the steps of:

applying sufficient pressure to $NH_4VO_3$ to form a $NH_4VO_3$ pellet having a density of from about 1.7 g/cc–1.9 g/cc;

subjecting said $NH_4VO_3$ pellet to a sufficient amount of heat to decompose said $NH_4VO_3$ pellet into $V_2O_5$ and gaseous $NH_3$; and reducing the $V_2O_5$ with the gaseous $NH_3$ to form said vanadium oxide.

8. The method of claim 7 wherein said vanadium oxide has a surface area of about 20 to about 24 $m^2/g$.

9. The method of claim 7 wherein said vanadium oxide has a surface area of about 21 to about 23 $m^2/g$.

10. The method of claim 9 wherein the step of subjecting said $NH_4VO_3$ pellet to a sufficient amount of heat comprises raising the temperature of said dense $NH_4VO_3$ pellet to a temperature of between about 200° to 500° C.

11. The method of claim 10 wherein the step of raising the temperature of said $NH_4VO_3$ pellet comprises raising the temperature at a rate of approximately 0.5° to 1° C. per minute.

12. The method of claim 11 wherein the step of raising the temperature of said $NH_4VO_3$ pellet comprises heating said $NH_4VO_3$ pellet from about room temperature to about 450° C. over about a 14 hour period.

13. The method of claim 7 wherein the step of applying pressure to the $NH_4VO_3$ to form the $NH_4VO_3$ pellet comprises applying about 600 to 1,500 $kg/cm^2$ of pressure.

14. The method of claim 9 wherein the step of applying pressure to the $NH_4VO_3$ to form the $NH_4VO_3$ pellet comprises applying about 600 to 1,500 $kg/cm^2$ of pressure.

* * * * *